US007909907B1

(12) United States Patent
Ripley et al.

(10) Patent No.: US 7,909,907 B1
(45) Date of Patent: Mar. 22, 2011

(54) METHODS FOR HIGH VOLUME PRODUCTION OF NANOSTRUCTURED MATERIALS

(75) Inventors: Edward B. Ripley, Knoxville, TN (US); Jonathan S. Morrell, Knoxville, TN (US); Roland D. Seals, Oak Ridge, TN (US); Gerald M. Ludtka, Oak Ridge, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 0 days.

(21) Appl. No.: 12/552,633

(22) Filed: Sep. 2, 2009

Related U.S. Application Data

(62) Division of application No. 11/415,840, filed on May 2, 2006, now Pat. No. 7,601,294.

(51) Int. Cl.
*B22F 1/00* (2006.01)
(52) U.S. Cl. .......................................... 75/343; 75/331
(58) Field of Classification Search ................ 75/330, 75/331, 343
See application file for complete search history.

(56) References Cited

U.S. PATENT DOCUMENTS

| | | | |
|---|---|---|---|
| 5,270,616 A | 12/1993 | Itatani | |
| 5,273,587 A | 12/1993 | Guha et al. | |
| 6,204,606 B1 | 3/2001 | Spence et al. | |
| 6,246,175 B1 | 6/2001 | Kou et al. | |
| 6,401,653 B1 | 6/2002 | Taniguchi et al. | |
| 6,437,512 B1 | 8/2002 | Chen et al. | |
| 6,525,481 B1 | 2/2003 | Klima et al. | |
| 6,607,633 B2 | 8/2003 | Noguchi | |
| 6,666,923 B1 | 12/2003 | Jeong et al. | |
| 6,667,577 B2 | 12/2003 | Shannon et al. | |
| 6,675,737 B2 | 1/2004 | Hongoh et al. | |
| 6,726,802 B2 | 4/2004 | Tadera et al. | |
| 6,729,261 B2 | 5/2004 | Hongo | |
| 7,622,189 B2 * | 11/2009 | Ripley et al. .................. 428/372 |
| 2002/0179564 A1 | 12/2002 | Geobegan et al. | |
| 2003/0203205 A1 | 10/2003 | Bi et al. | |
| 2004/0118347 A1 | 6/2004 | Groves et al. | |
| 2004/0219091 A1 | 11/2004 | Kim et al. | |
| 2005/0230356 A1 | 10/2005 | Empedocles et al. | |
| 2005/0271829 A1 | 12/2005 | Kumar et al. | |
| 2007/0266825 A1 | 11/2007 | Ripley et al. | |

FOREIGN PATENT DOCUMENTS

EP 1377138 1/2004

OTHER PUBLICATIONS

Naudin, Jean-Louis, "Plasmoid (Ball Lightning) Generation with a Microwave Resonator" http://jlnlabs.online.fr/plasma/4wres/index.htm, Original publication date unknown 9 pages.

* cited by examiner

Primary Examiner — Scott Kastler
(74) Attorney, Agent, or Firm — Michael J. Renner; Luedeka, Neely & Graham PC

(57) ABSTRACT

A system and method for high volume production of nanoparticles, nanotubes, and items incorporating nanoparticles and nanotubes. Microwave, radio frequency, or infrared energy vaporizes a metal catalyst which, as it condenses, is contacted by carbon or other elements such as silicon, germanium, or boron to form agglomerates. The agglomerates may be annealed to accelerate the production of nanotubes. Magnetic or electric fields may be used to align the nanotubes during their production. The nanotubes may be separated from the production byproducts in aligned or non-aligned configurations. The agglomerates may be formed directly into tools, optionally in compositions that incorporate other materials such as abrasives, binders, carbon-carbon composites, and cermets.

10 Claims, 8 Drawing Sheets

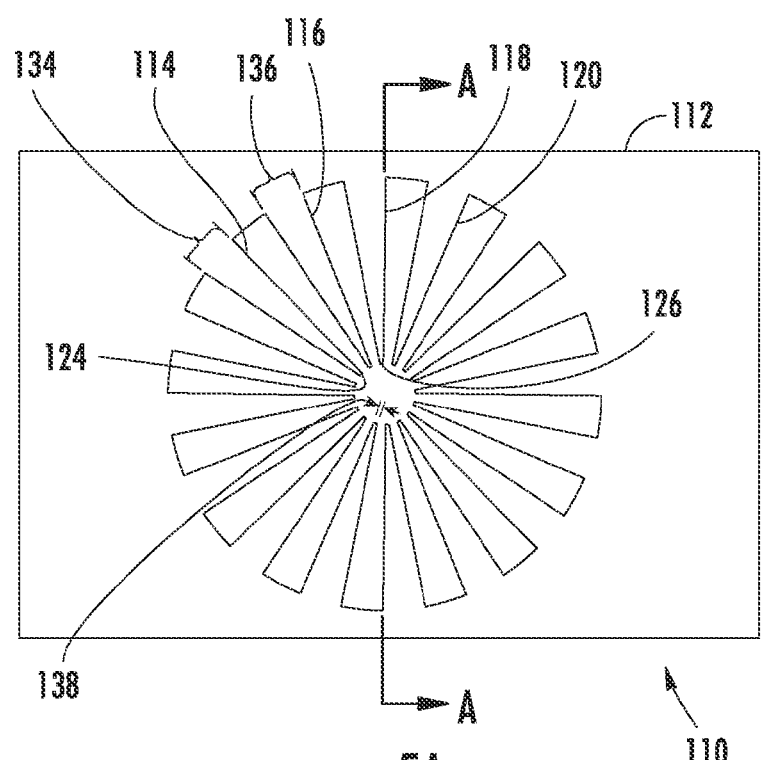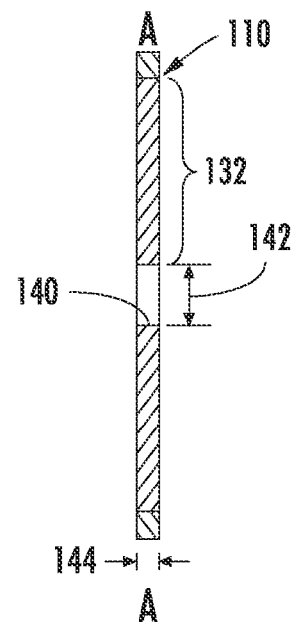
FIG. 5A
FIG. 5B

US 7,909,907 B1

METHODS FOR HIGH VOLUME PRODUCTION OF NANOSTRUCTURED MATERIALS

CROSS REFERENCES TO RELATED APPLICATIONS

This application is a Divisional Application of currently pending and allowed U.S. patent application Ser. No. 11/415,840 filed May 2, 2006, now U.S. Pat. No. 7,601,294 entitled: "HIGH VOLUME PRODUCTION OF NANOSTRUCTURED MATERIALS."

GOVERNMENT RIGHTS

The U.S. Government has rights to this invention pursuant to contract number DE-AC05-00OR22800 between the U.S. Department of Energy and BWXT Y-12, L.L.C. The U.S. Government has rights to this invention pursuant to contract number DE-AC05-00OR22725 between the U.S. Department of Energy and UT—Battelle, LLC.

FIELD

This invention relates to the field of production of nanostructured materials including carbon, boron, germanium, and silicon materials. More particularly, this invention relates to a method of the making such materials in forms suitable for use in mechanical and electrical components.

BACKGROUND

Until a few years ago the known forms of carbon were graphite, diamond, and graphite-like particles called amorphous carbon. Then in 1985 another form of carbon was discovered: a hollow cluster of 60 carbon atoms shaped like a soccer ball. This molecule also became known as a "Buckminsterfullerene" (or a "fullerene" for short). The name is in recognition of the American architect R. Buckminster Fuller, whose geodesic domes have a similar structure. Carbon nanotubes were discovered in 1991. Carbon nanotubes are cylindrical, stretched versions of hollow fullerenes. Some nanotubes have walls that are a single carbon atom thick; others have two or more concentric layers of atoms. Because of the 60 carbon atoms, fullerenes are sometimes referred to as C60. Carbon also forms other molecular structures, such as C70, C76, C84, and C102. All of these forms of carbon typically only exist as very small structures having at least one physical dimension that is smaller than 100 nanometers. These materials are collectively referred to as carbon "nanostructures." The term nanostructures encompasses nanotubes, nanoparticles and other nanometer-size materials. Carbon nanostructures have been an area of significant interest because of their unusual electrical and mechanical properties. In addition to carbon nanostructures, other forms of nanostructures are silicon nanoparticles, silicon nanofibers, silicon-based nanostructured materials, and rare earth or metal-doped silicon nanostructured materials, as well as boron and germanium nanostructures. Nanostructures offer promise in such applications as superstrong materials, extremely small and fast computer chips, and electronic interconnects.

One major obstacle to commercial development of nanotechnology is the inefficiency of production processes for manufacturing nanostructured materials. Current state-of-the-art manufacturing processes are very limited in capacity, and alternative methods that have been proposed are not economically viable. Methods that are typically used to manufacture carbon nanomaterials include electric arc, laser or chemical conversion processes that use a gas precursor such as alcohols (e.g., ethanol, methanol), carbon monoxide, methane, or ethyne (acetylene) as the feedstock or use a solid material that is vaporized by one of these processes. A specific difficulty that is often encountered with these processes is that gas boundary layers on the collection surfaces prevent a high growth rate of nano structures.

Another impediment to commercial development of nanotechnology is that current production methods for nanostructured materials, particularly carbon nanotubes, result in either (a) a very low percentage of single wall or multi-wall nanotubes mixed with large amounts of precursor or byproduct materials, or (b) a mixture of single wall and multi-wall nanotubes. The extraction of single wall or multi-wall nanotubes from extraneous material is costly and time consuming, and the separation of single wall from multi-wall nanotubes is extremely difficult. Consequently, these present processes typically produce only a few grams of material a day. The resulting high costs of producing nanostructures severely limits their use in commercial products, and consequently these materials have generally been relegated to the realm of a scientific curiosity. What are needed are production apparatuses and techniques for economically manufacturing high purity nanostructured materials in high volumes.

SUMMARY

The present invention provides an apparatus for manufacturing nanostructure material. The apparatus includes a fluid feed stream. There is a metal catalyst feeder for introducing metal catalyst feed material into the fluid feed stream and a nano-element feeder for introducing nano-element feed material into the fluid feed stream. A vaporizer is provided to (a) form metal catalyst vapor from the metal catalyst feed material and (b) establish atomic nano-element from the nano-element feed material. A condenser is provided for condensing the metal catalyst vapor into metal catalyst particles and for aggregating the metal catalyst particles and nano-element nano-particle clusters as metal nano-element agglomerates.

A method for fabricating nano-structure material is defined. The method begins with merging nano-element feed material and metal catalyst feed material into a fluid feed stream, and continues with establishing atomic nano-element in the fluid feed stream, and then vaporizing the metal catalyst feed material to form metal catalyst vapor in the fluid feed stream. The method then proceeds with condensing the metal catalyst vapor to form metal catalyst particles and consolidating the atomic nano-element in the fluid feed stream to form nano-element nano-particle clusters. The method then proceeds with aggregating the nano-element nano-particle clusters and metal catalyst particles into metal nano-element agglomerates.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein:

FIG. 5A is a plan view of a microwave plasma generator used in some embodiments.

FIG. 5B is a side view of the microwave plasma generator of FIG. 5A.

DETAILED DESCRIPTION

Described herein are various embodiments of methods and apparatuses for the high volume production (HVP) of nanostructures. For example, the HVP methods described may be used to produce carbon nanoparticles, carbon nanotubes, carbon nanostructured materials, silicon nanoparticles, silicon nanofibers, silicon-based nanostructured materials, rare earth or metal-doped silicon nanostructured materials, as well as germanium- and boron-based nanostructures. The chemical elements (i.e., carbon, silicon, germanium, and boron) that are suitable for the formation of such nanostructures are referred to as "nano-elements." The resulting structures have a variety of useable morphologies (e.g., quantum dots, nanoparticles, fibers, rods, sheets, curtains and irregular agglomerations of nano-sized particles). These structures have many industrial uses because of their unusual properties such as Coulomb blockade capability and visible light emission capability. These phenomena are related to a quantum confinement of charge carriers and may be utilized in semiconductor devices such as in single-electron transistors or memory cells and in light emitting devices (LED) or displays. Also described herein are methods of selectively separating and collecting certain size and morphologies of nanostructured materials. Alternately, the materials may be used as precursors to processes that form coherent components made of in-situ grown nanostructured materials. Although specific nanomaterials (particularly carbon nanostructures) are discussed as examples herein, it is not the intention to restrict the scope of potential embodiments to these few materials. Potential embodiments encompass all of the nano-elements.

Figure 1:
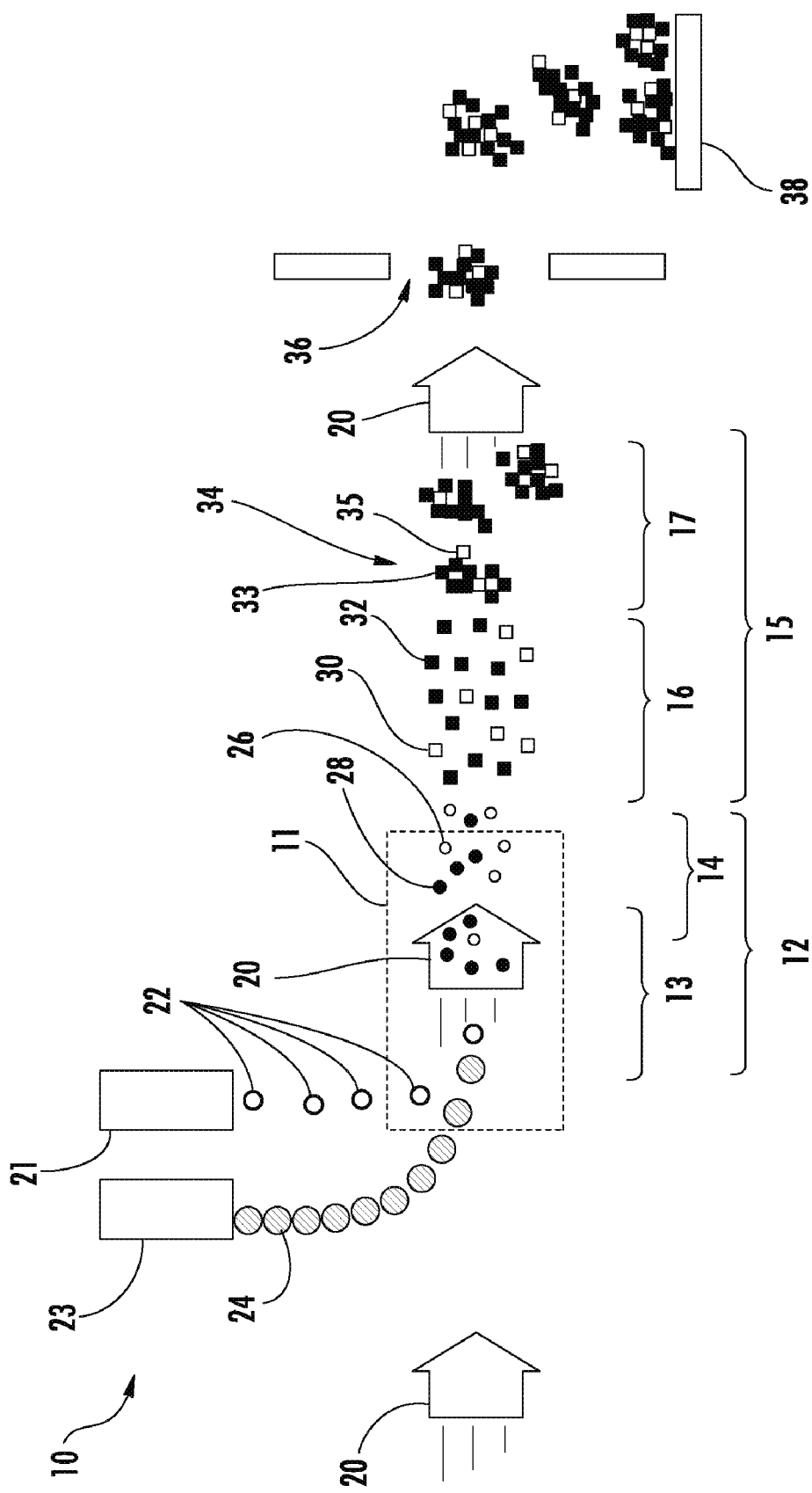
FIG. 1 is a schematic representation of a nanostructure production apparatus according to the invention.

The details of various embodiments are further understood by a review of the Figures. A preferred embodiment of an apparatus 10 for manufacturing nanostructure material is shown in FIG. 1. "Nanostructure material" refers to material comprised of nanostructures and precursor or intermediate-stage particulate materials that may be used to make nanostructures, where the precursor and intermediate-stage particulate materials are on the order of less than several microns in size. "Nano-element nanostructure material" refers to nanostructure material comprising nano-elements. For example, carbon nanostructure material comprises carbonaceous materials that include carbon nanostructures and precursor or intermediate stage particulate carbonaceous materials that may be used to make carbon nanostructures, where the precursor and intermediate-stage particulate carbonaceous materials are on the order of less than several microns in size. Apparatus 10 has a heat source 11, a vaporizer 12, and a condenser 15.

Heat source 11 may be a modified thermal spray system such as that used in plasma spray coating deposition processes (which includes a number of processes such as radio frequency (RF) plasma spray, combustion spray, flame spray, high velocity oxyfuel spray, or arc spray). Heat source 11 may be a laser, an infrared heater, or even a more conventional electrical heater. Heat source 11 may be a hollow cathode glow discharge system (to be described later). Heat source 11 may be a plasma generator. Plasma is considered by many scientists to be a fourth state of matter (differentiated from the solid, liquid and gaseous states). In a sufficiently heated gas many, although not necessarily all, of the gaseous atoms ionize, thereby creating clouds of free electrons and ions. This ionized gas mixture, consisting of ions, electrons, and neutral atoms, is called plasma. In the most preferred embodiments, heat source 11 is a CZ (controlled zone) microwave plasma generator (also to be described in detail later).

Vaporizer 12 includes "hot zone" 13 and vaporization region 14. Metal catalyst feed material 22 is introduced by a metal catalyst feeder 21 into the apparatus at hot zone 13 where metal catalyst feed material 22 is heated by the heat source 11 to the vaporization temperature of the metal catalyst feed material 22. In this configuration the metal catalyst is described as a "floated catalyst." In some embodiments, nano features (e.g., grains, humps, particles) on the surface of a metal particle provide the catalytic effect; these nano features constitute a "supported catalyst." The metal catalyst feed material 22 may consist of, but is not limited to, nickel, iron, cobalt, or a combination of these. If metal wire is used as the metal catalyst feed material 22, then the metal catalyst feeder 21 may be a mechanical spool feeder similar to that used in metal arc or plasma arc welding systems. If powder is used as the metal catalyst feed material 22, then metal catalyst feeder 21 may be a powder feeder similar to that used in a plasma spray apparatus.

Nano-element feed material 24 is also introduced into apparatus 10, using nano-element feeder 23, at a location where it is heated by heat source 11. Carbon is an example of a nano-element feed material 24. A carbon feeder is an example of a nano-element feeder 24. If the nano-element feed material 24 is a gas, then nano-element feeder 24 may be a conventional welding gas regulator and nozzle. If the nano-element feed material 24 is a solid rod, nano-element feeder 23 may be a linear actuator that feeds a rod of feed material 24 (such as a carbon rod) into apparatus 10. If the nano-element feed material 24 is powdered material such as powdered carbon, nano-element feeder 23 may be a powder feeder similar to that used in a plasma spray apparatus. The metal catalyst feed material 22 and the nano-element feed material 24 (collectively referred to as "feedstock"), may be introduced into the apparatus separately (as illustrated in FIG. 1) or the metal catalyst feed material 22 and the nano-element feed material 24 may be pre-mixed and introduced together. If introduced together, then metal catalyst feeder 21 and nano-element feeder 23 are combined into a single unit and the combined material is introduced at a location where it is heated by heat source 11.

A vaporization region 14 is provided to promote the complete vaporization of the metal catalyst feed material 22 and the nano-element feed material 24. Typically, as depicted in FIG. 1, the vaporization region starts within the hot zone 13 and extends slightly beyond hot zone 13. That is, the temperature at the end of the vaporization region 14 (i.e., the right side of vaporization region 14 in FIG. 1) is somewhat lower than the temperature in the hot zone 13, but the temperature at this end of the vaporization region 14 is still above the vaporization temperature of the metal catalyst feed material 22 and the nano-element feed material 24. The vaporization region 14 is considered to terminate at the point where the heat source 11 fails to maintain the vaporization temperature of either the metal catalyst feed material 22 or the nano-element feed material 24.

Preferably the feedstock provides at least one atomic percent of metal catalyst in the material that is produced (that is, deposited and collected) by the apparatus. In the most preferred embodiments the feedstock provides between one and three atomic percent of metal catalyst in the material that is produced by the apparatus. Assuming an efficient production process, the atomic percent of metal catalyst in the material that is produced by the apparatus is substantially determined by the atomic percent of metal in the feedstock. Consequently the desired end-product material specifications may be used to establish feedstock ratios. The weight percent ratios are calculated in Eq'n 1 for the case where iron is used as the metal catalyst and carbon is the nano-element feed material, with a 1 atomic percent Fe and 99 atomic percent carbon.

$$\text{Wt \% Fe} = \frac{(0.01)(55.847)}{(0.01)(55.847) + (0.99)(12.011)}(100) = \qquad \text{Eq'n 1}$$

4.486 wt % Fe (metal by weight)

Eq'n 2 presents the formula for 3 atomic percent Fe and 97 atomic percent carbon.

$$\text{Wt \% Fe} = \frac{(0.03)(55.847)}{(0.03)(55.847) + (0.97)(12.011)}(100) = \qquad \text{Eq'n 2}$$

12.5724 wt % Fe (metal by weight)

When the nano-element feed material 24 is carbon, the nano-element feed material may be elemental carbon (C) such as graphite, or a carbon compound such as ethanol ($C_2H_6O$), methanol ($CH_4O$), methane ($CH_4$), carbon monoxide (CO), ethyne (acetylene) ($C_2H_2$), or other carbon compound that combusts or dissociates to produce free carbon atoms at the temperature where the material is introduced into apparatus 10. One important function of the vaporizer 12 is to establish atomic nano-element in apparatus 10. For example, when the nano-element feed material 24 is carbon, an important function of the vaporizer 12 is to establish atomic carbon. If elemental carbon is used as nano-element feed material 24, then there is no chemical conversion required to generate free atomic carbon atoms. The term "atomic carbon" refers to a vaporized form of carbon consisting primarily of C atoms, and $C_2$ and $C_3$ ionic species, or any other carbon molecular species that forms pure carbon later in the condensation region 16. In the generalized case of nano-elements, the term "atomic nano-element" refers to vaporized forms of the nano-element in a stable, ionic, or molecular species that forms a pure nano-element later in the condensation region 16. In the case of carbon as the nano-element feed material 24, vaporizer 12 may establish atomic carbon in apparatus 10 either by chemically extracting carbon from a carbon compound or by utilizing elemental carbon that is introduced directly as nano-element feed material 24. The process of either (1) chemically extracting atomic carbon from carbon feed material, or (2) utilizing elemental carbon in carbon feed material, is referred to herein as "establishing atomic carbon," and that is a specific example of establishing atomic nano-element. In some embodiments the process of establishing atomic nano-element occurs entirely in a hot zone (e.g., hot zone 13) and there is no separate vaporization region 14.

In cases where the nano-element being processed is silicon, silane ($SiH_4$) is a suitable nano-element feed material 24. For boron, boron hydride ($B_5H_9$) and for germanium, germanium tetrahydride ($GeH_4$) may be used as the feed material. Alternately, the powders of nano-elements having particle sizes preferably less than about two microns in size may be entrained in a carrier gas (such as argon, argon with hydrogen, or other inert gases) and may be used as the feed material that will be transformed into nanostructures. A bulk stock form of the nano-element, such as a rod, may also be used by inserting the stock into a hot zone (e.g., hot zone 13) and ablating nano-element material to form the feed material. The nano-element feed materials may be oxides of the nano-element. A metal catalyst may be used with any of these nano-element feed materials 24.

Continuing with FIG. 1, heat source 11 rapidly heats the metal catalyst feed material 22 and the nano-element feed material 24 to form metal catalyst vapor 26 and to establish atomic nano-element 28 in vaporizer 12. For high volume production of nanomaterials, large quantities of feed stock must be moved (flowed) into the hot zone 13 of the heat source 11, and the residence time in the hot zone 13 must be sufficient for vaporization. Many embodiments incorporate a fluid feed stream 20 to establish this flow. Fluid feed stream 20 is preferably an inert gas such as argon or helium that creates an environment in apparatus 10 that prevents detrimental chemical interactions between the atmosphere in the apparatus and the processes that are occurring. In some embodiments, fluid feed stream 20 may be a vapor or a liquid. Typically the fluid feed stream 20 entrains the nano-element feed material 24 and the metal catalyst feed material 22 so that they move in a substantially continuous unidirectional flow into and through the vaporizer 12 and into and through the condenser 15. While many embodiments include a separate fluid feed stream 20, in embodiments where the nano-element feed material 24 or the metal catalyst feed material 22 is gaseous, the flow of the nano-element feed material 24 or the metal catalyst feed material 22 may eliminate the need for a separate fluid feed stream 20. In those configurations the gaseous nano-element feed material 24 and/or the metal catalyst feed material 22 is also the fluid feed stream 20. In some embodiments, either the nano-element feed material 24 or the metal catalyst feed material 22 may be held in one location and the other feed material is flowed to that location. An example of this embodiment is in a hollow cathode glow discharge system (to be described later). The process of holding one feed material stationary while flowing the other feed material past the stationary feed material is called "merging nano-element feed material and metal catalyst feed material into a fluid feed stream."

In some embodiments where the feed materials are in powder form, apparatus 10 may be physically oriented to be vertical and then gravity may be used to flow the feedstock through the apparatus. Regardless of the physical orientation of the flow it is highly desirable to use feed material that has particles large enough for easy flow or movement. Small or fine particles are difficult to feed because of agglomeration.

Preferably the residence time of the nano-element feed material 24 in the vaporizer 12 is of sufficient duration to vaporize substantially all of the nano-element feed material 24. The metal catalyst vapor 26 and atomic nano-element 28 pass from the vaporizer 12 into the condenser 15. Condenser 15 includes a condensation region 16 and an aggregation region 17. In condensation region 16, metal catalyst vapor 26 condenses to form metal catalyst particles 30. At this stage where carbon is the nano-element, the metal catalyst particles 30 are preferably maintained at a temperature that is greater than about 500° C. but is less than the "mushy state" temperature of the metal catalyst particles 30. Also in condensation region 16, atomic nano-element 28 consolidates to form nano-element nano-particle clusters 32. In the specific case of carbon as the nano-element, the atomic carbon consolidates to form carbon nano-particle clusters. The process of consolidating the atomic nano-element 28 occurs because as the atomic nano-element 28 atoms and molecules cool they de-energize and begin to adhere to each other. An analogous process of consolidating occurs with the other nano-elements. In the case where carbon is the nano-element feed material 24, amorphous carbon, graphite, and even diamond may form in the nano-element nano-particle clusters 32, and in the context of the nano-element nano-particle clusters 32, a composition of one or more of those materials is referred to herein simply as "carbon." Time-resolved spectroscopy and spectroscopic imaging shows that, in the case of carbon as the nano-element feed material 24, the time of nucleation of the nano-element feed material 24 from atomic and molecular species (atomic nano-element 28) to nano-element nano-particle clusters 32 is around two hundred microseconds, and the time of nucleation of the metal catalyst feed material 22 to metal catalyst particles 30 is around two milliseconds.

In the embodiment of FIG. 1, the metal catalyst particles 30 and the nano-element nano-particle clusters 32 then move to aggregation region 17 where the metal catalyst particles 30 and atomic nano-element 28 aggregate to form metal nano-element agglomerates 34. It is also possible, but with lower probability, that the metal catalyst particles 30 and the nano-element particle clusters 32 will aggregate to form metal nano-element agglomerates 34. These processes are called "aggregating." The metal nano-element agglomerates 34 may comprise metal that has nano-element 33 physically adhering to the surface of the metal, or metal containing dissolved nano-element, or combinations thereof. This nano-element-bearing metal forms small particles which are referred to herein as "nano-elemetized metal particles" 35. In the specific case of carbon as the atomic nano-element 33, the metal nano-element agglomerates 34 may comprise metal that has carbon physically adhering to the surface of the metal, or metal containing dissolved carbon, or combinations thereof.

Nano-elemetized metal particles 35 are distinguished from previously described metal catalyst particles 30 because the nano-elemetized metal particles 35 comprise some amount of nano-element (e.g., carbon) picked up by the metal catalyst particles 30 while passing through aggregation region 17. In other words, the nano-elemetized metal particles 35 in the metal nano-element agglomerates 34 comprise a small amount of nano-element (e.g., carbon) that has been absorbed or adsorbed from the nano-element nano-particle clusters 32. In preferred embodiments, flow rates and temperatures are adjusted so that the nano-elemetized metal particles 35 in the metal nano-element agglomerates 34 are nano-sized particles. (As previously noted, nano-sized particles are particles having at least one physical dimension that is smaller than 100 nanometers.) Various combinations of flow rates and temperatures may be used to accomplish this. In the case of carbon as the nano-element, if the metal nano-element agglomerates 34 are nano-sized particles and if the temperature of the metal catalyst in the condenser 15 remains at or above 500° C. and below the vaporization temperature of the metal catalyst, carbon nanotubes will form and grow. Nano-sized nano-elemetized metal particles 35 of a few (1-20) nanometers tend to grow single wall carbon nanotubes. Larger diameter nano-sized nano-elemetized metal particles 35 formed with carbon tend to grow multi-wall carbon nanotubes.

It should be noted that in some embodiments there is no distinction between condensation region 16 and aggregation region 17 in condenser 15. That is, the metal catalyst vapor 26 condenses to form metal catalyst particles 30 and the atomic nano-element 28 consolidates to form nano-element nano-particle clusters 32 and the metal catalyst particles 30 and atomic nano-element 28 aggregate to form metal nano-element agglomerates 34 in a condenser 15 that has a single substantially uniform process region.

After agglomeration, the metal nano-element agglomerates 34 pass through a delivery aperture 36 and may be collected (in a cooled and quenched state) in a particle deposition system 38 and later used to produce nano-element nanotubes by condensed phase conversion (a process that is described later). Particle deposition system 38 may be a vessel made from refractory material such as alumina or particle deposition system 38 may be a glass or metal plate, or any cool surface.

It has been previously noted that some embodiments do not employ a fluid feed stream. In these embodiments the metal catalyst feed material 22 and the nano-element feed material 24 are introduced by feeders into the vaporizer 12 where they are vaporized by heat source 11 to form metal catalyst vapor 26 and atomic nano-element 28. The metal catalyst vapor 26 and the atomic nano-element 28 then are removed from heat source 11. The removal of metal catalyst vapor 26 and the atomic nano-element 28 from heat source 11 may be accomplished by such mechanisms as turning off heat source 11, or by expanding the mixture of metal catalyst vapor 26 and the atomic nano-element 28 beyond the confines of heat source 11, or by dropping (by gravity) the mixture of metal catalyst vapor 26 and the atomic nano-element 28 to a location below heat source 11. After the mixture of metal catalyst vapor 26 and the atomic nano-element 28 are removed from heat source 11 they enter a lower-temperature environment (characterized as condenser 15) where they condense and aggregate.

Figure 2:
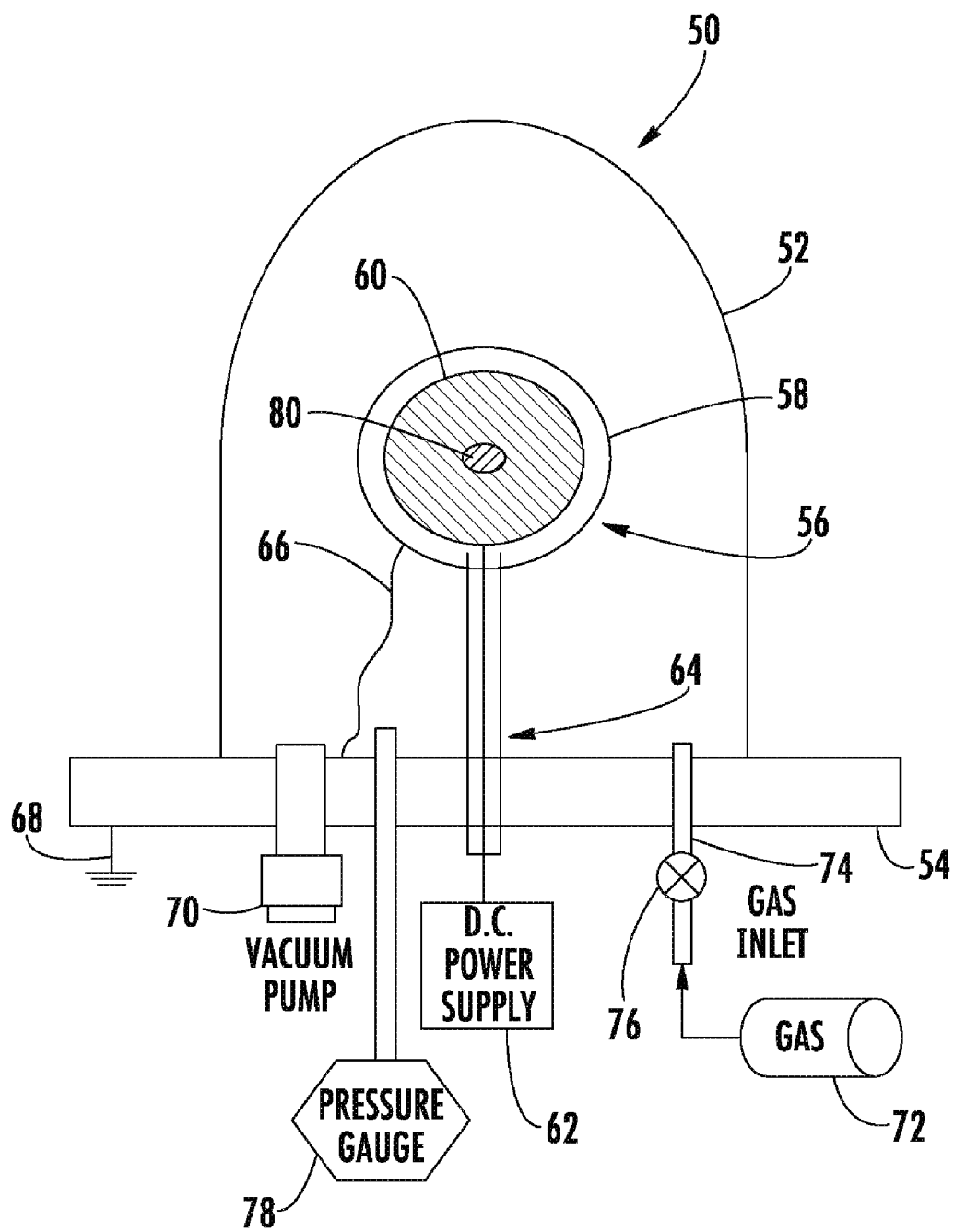
FIG. 2 is a schematic of a hollow cathode plasma generator embodiment.

FIG. 2 illustrates an alternative apparatus for manufacturing nanostructure material. A hollow cathode glow discharge system 50 is depicted. As will be illustrated, hollow cathode glow discharge system 50 has elements that are analogous to the elements of apparatus 10 shown in FIG. 1. Hollow cathode glow discharge system 50 includes a bell jar 52 which rests on base plate 54 and houses a plasma generator 56. Plasma generator 56 comprises an anode 58 and a cathode 60. In some embodiments, anode 58 and cathode 60 are open ended cylinders. D.C. power supply 62 provides electric current to anode 58 through anode supply 64. D.C. power supply 62 is preferably adjustable to provide between 0-3000 volts and 0-1.0 amperes. Cathode 60 is grounded by ground wire 66 that connects to instrument ground 68. A vacuum pump 70 is used to remove ambient air from the chamber inside bell jar 52, and a gas supply 72 provides a source of plasma gas to the chamber of bell jar 52 through connection 74. The plasma gas composition may include, but is not limited to, $H_2+CH_4$ or $He+CH_4$ or other inert+organic gaseous mixtures, or organic gases without inert gas. The plasma gas provides the source of carbon for production of metal nano-element agglomerates 34 depicted in FIG. 1. Gas supply 72 is an example of the nano-element feeder 23 depicted in FIG. 1. A regulator valve 76 controls the flow of the process gas from gas supply 72. A pressure gage 78 monitors the pressure inside the chamber of bell jar 52. Plasma gas pressures are preferably set within a range of about 0.1 to 2 torr.

The outside diameter of the cathode 60 is sized to be only slightly smaller than the inside diameter of the anode 58 such that the two surfaces are in close proximity. This geometry plus process controls that keep the pressure-distance product (P*d) low enough to be on the left side of the P*d minimum prevents a glow from occurring on the outside of the cathode 56. This configuration has the further benefit of optimizing fast electron emission on the inner surface of the cathode 60 for heating the metal catalyst feed material 80.

The metal catalyst feed material 80 is preferably a solid metal workpiece that is centrally located within the cavity of hollow cathode 60, but not touching the hollow cathode 60. Metal catalyst feed material 80 is analogous to the metal catalyst feed material 22 depicted in FIG. 1. Fast electrons bombard the metal catalyst feed material to produce metal catalyst vapor. In some embodiments metal catalyst feed material 80 is a workpiece that comprises metal particles embedded in graphite that form a composite material. The graphite then serves as a source of carbon for production of metal nano-element agglomerates (such as the metal nano-element agglomerates 34 depicted in FIG. 1), and such composite material is analogous to the nano-element feed material 24 depicted in FIG. 1. The use of graphite in the workpiece may obviate the need for organic gas content in the plasma gas. In the later case where the workpiece is graphite as the carbon source and metal as the metal catalyst source, inert gas such as argon is used as the plasma gas. In some embodiments a process gas such as nickel chloride is used to provide the metal catalyst, which may obviate the need for a workpiece.

In embodiments where the metal catalyst feed material 80 is a solid workpiece, the metal catalyst feed material 80 preferably is mechanically supported by a support (not shown) capable of withstanding high temperatures resulting from being exposed to the ionized gas or plasma. This mechanical support is analogous to the metal catalyst feeder 21 depicted in FIG. 1. The high temperature mechanical support may include a thermocouple (not shown) and may be an arm embedded in the workpiece so that the support is effectively shielded from the plasma and electron bombardment. External heating of the metal catalyst feed material 80 is not required since the fast electrons emitted from the cathode 60 internal surface provides a highly effective means of heating any object contained in the center of the cathode cavity.

The combination of the anode 58 and the cathode 60 of the hollow cathode glow discharge system 50 is illustrative of the heat source 11 depicted in FIG. 1. The metal catalyst feed material 80 is not a part of the electrical system of the hollow cathode glow discharge system 50. When D.C. power supply 62 creates an electric current between anode 58 and cathode 60, a plasma is formed. The plasma heats, melts, and vaporizes the surface of the metal catalyst feed material 80. This configuration of FIG. 2 is particularly beneficial because the metal catalyst feed material 80 is not the cathode, and thus does not need to be an electrically active part of the system. Therefore, the electrical connections do not need to be made and maintained at high temperature.

Figure 3:
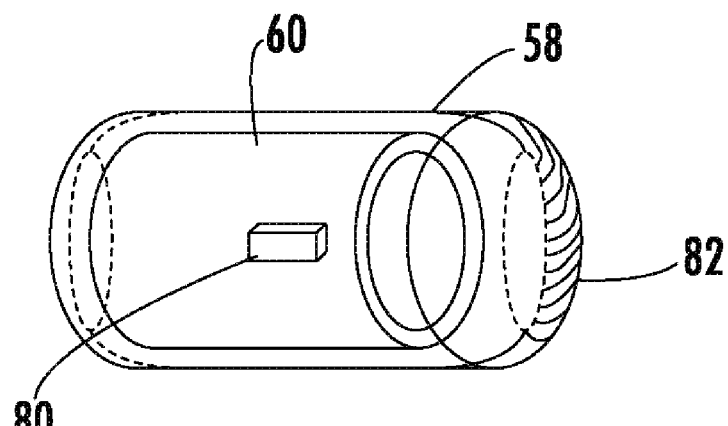
FIG. 3 is a perspective sketch of a cylindrical hollow cathode plasma generator embodiment.

There are many arrangements and configurations for the hollow cathode glow discharge system 50, including various electrode shapes and sizes as well as gas flow options. The focus of the fast electrons onto the metal catalyst feed material 80 surface may be optimized (and an increase in heating efficiency achieved) by extending the anode 58 around the edge of the cathode 60 by using a curved wire mesh anode extension 82 to form a cavity that more completely contains cathode 60, as shown in FIG. 3. Curved wire mesh anode extension 82 helps prevent fast electron loss due to ejection from the cavity of anode 58.

Figure 4:
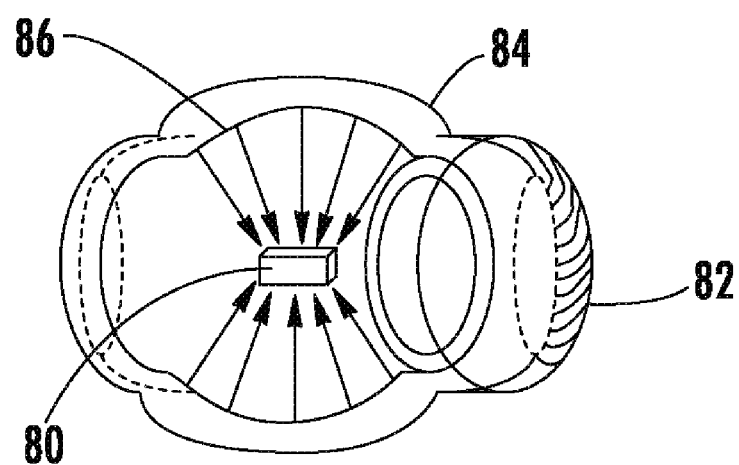
FIG. 4 is a perspective sketch of a spherical hollow cathode plasma generator embodiment.

During operation, the cathode 60 is connected to ground and a plasma glow is established by varying the voltage from power supply 62 between a few hundreds of volts to several thousands of volts, depending on the nature of the gas and the pressure. The partially ionized gas nearest the anode 58 contains electrons and ions at thermal energies or nearly so. Near the cathode 60 are ions, slow and fast electrons, photons, and fast neutral atoms. The ions and electrons liberate more electrons as they move toward and/or away from the cathode 60. The high energy, fast electrons, also known as "runaway electrons," decrease in capture cross section and increase in energy and can be focused by the cathode curvature. The fast electrons may be better focused to heat the metal catalyst feed material 80 with a more spherical hollow anode 84 and cathode 86, as depicted in FIG. 4.

A component of an alternate embodiment is illustrated in FIGS. 5A and 5B. An arc generator 110 is shown to incorporate an electrically conductive plate 112. In the most preferred embodiments, conductive plate 112 is fabricated from graphite; however, other conductive materials may also be used. Conductive plate 112 has a series of conductive fingers with example conductive fingers 114, 116, 118, and 120 being labeled. While tapered conductive fingers are illustrated in FIG. 5A, other shapes may be used such as rods, levers, teeth, projections, or sections separated by notches. In the descriptions herein the term "finger" will be used to encompass all such shapes. The conductive fingers (e.g., 114, 116, 118, and 120) have tips as illustrated by example tips 124 and 126 at the center of conductive plate 112. Preferably the tips have sharp edges. In FIGS. 5A and 5B, the conductive fingers as illustrated by example conductive fingers 114, 116, 118, and 120 which are shown as having substantially the same shape. The conductive fingers as illustrated by example conductive fingers 114, 116, 118 and 120 have a length 132. Example finger 114 is shown to have a base 134 and example finger 116 is shown to have a base 136. The tips (e.g., 124, 126) have a tip spacing with example tip spacing 138 labeled. The tips converge to an aperture 140 having an aperture diameter 142. The thickness 144 of conductive plate 112 is preferably about one sixteenth inch (1.59 mm).

When the arc generator 110 is exposed to microwave energy, a plasma arc forms in the aperture 140 between the tips (e.g., 124, 126) of the conductive fingers (e.g., 114, 116). Most preferably the spacing between the conductive fingers (e.g., 114, 116, 118, and 120) increases from their tips (e.g., 124, 126) to their bases (e.g., 134, 136). The design of FIGS. 5A and 5B has the arc concentrated at the tips (e.g., 124, 126) because the shortest distance between the conductive fingers (e.g., 114, 116, 118, and 120) is at the tips (e.g., 124, 126). This design concentrates the plasma in the circular aperture 140. Any design in which the shortest distance between conductive fingers is at the tips of the conductive fingers is said to have "proximal tips." Although the tips (e.g., 124, 126) erode and the aperture 40 widens during use, the ends of the conductive fingers (e.g., 114, 116, 118, and 120) remain the closest adjacent points. The resulting plasma remains geometrically constrained by the tips (e.g., 124, 126) of the conductive fingers (e.g., 114, 116, 118, and 120). However, as the tips (e.g., 124, 126) erode, the spacing between the tips (e.g., 124, 126) increases, which decreases the efficiency of the plasma generation process. Eventually efficiency drops to an extent that the conductive plate 112 must be replaced, meaning that the tip life has been reached. The designed aperture diameter 142 and the length 132 of the conductive fingers may be varied depending upon the particular process requirements. However, most preferably, the length 132 is no shorter than approximately one fourth of the wavelength of microwave (or other electro magnetic field—EMF) energy used with arc generator 110.

As previously indicated, when the arc generator 110 is exposed to microwave energy, a plasma arc forms in the aperture 140. Microwaves in the frequency range of approximately 900 MHz (approximately 33 cm wavelength) to 50 GHz (approximately 6 mm wavelength) are typically used, with 2.45 GHz (approximately 12 cm wavelength) being the preferred frequency. Preferably, the aperture diameter 142 should be held to as small a size as process requirements will allow. In this embodiment the aperture 140 is shown as circular, and the bases (e.g., 134, 136) of the conductive fingers (e.g., 114, 116, 118 and 120) are shown to form a circle. In alternate embodiments the aperture 140 and the form of the bases (e.g., 134, 136) may be any geometric shape, including oval, triangular, square, polygonal, and so forth. A rectangular shape is often preferred for the bases (e.g., 134, 136) because a rectangular shape for the bases (e.g., 134, 136) facilitates mounting the conductive plate 112 by supporting the conductive plate 112 at the sides or at the top and bottom.

For 2.45 GHz microwaves, a preferable microwave arc generator 110 will have an aperture diameter 142 of one half an inch (or less) and a length 32 of approximately one and one half inches. That configuration will allow for adequate tip life before the plasma efficiency drops excessively.

Figure 6:
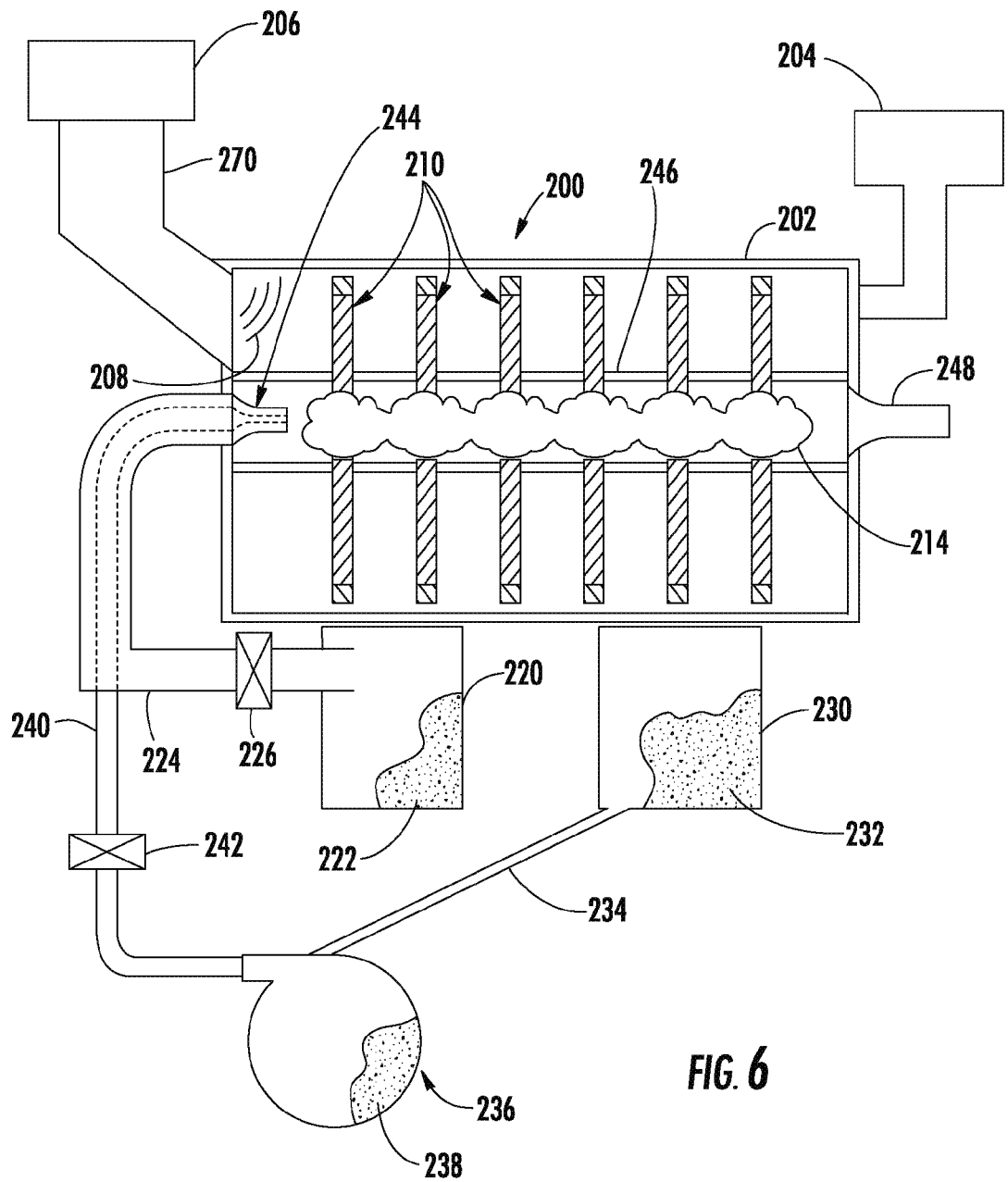
FIG. 6 is a schematic representation of a controlled zone, non-magnetically constrained microwave plasma system for production of nanostructure materials according to the invention.

FIG. 6 illustrates an embodiment of a controlled zone, non-magnetically constrained microwave plasma ("CZ microwave plasma") generator system 200. Microwave plasma generator system 200 has a microwave applicator 202, a process gas source 220, a process material source 230, and a carrier gas source 236. A microwave generator, in this case magnetron 206, produces microwaves 208 that are fed into applicator 202 through wave guide 270. The magnetron 206 is an example of the heat source 11 depicted in FIG. 1. A series of arc generators 210 are installed in applicator 202. In this embodiment, each of the arc generators 210 is the arc generator 110 depicted in FIGS. 5A and 5B.

A vacuum pump 204 evacuates microwave applicator 202. Process gas source 220 pumps process gas 222 into applicator 202 through conduit 224, regulated by valve 226. When microwaves 208 hit arc generators 210 in the presence of carrier gas 238 they initiate a plasma 214 in each of the arc generators 210.

Process material source 230 contains process material 232 that is conveyed via conduit 234 to carrier gas source 236 where the process material 232 is mixed with carrier gas 238. The mixture of process material 232 and carrier gas 238 is transported to the interior of applicator 202 through conduit 240, regulated by valve 242 to establish a desired process material flow rate. Alternate process material rate controller mechanisms may also be used alone or in combination with others to establish the desired process material flow rate. Examples of such alternate process rate controller mechanisms are a flow rate regulator installed on process material source 230 or installed on conduit 234.

In the embodiment depicted in FIG. 6, conduits 224 and 240 become coaxial as they approach applicator 202. Process gas 222, process material 232, and carrier gas 238 are propelled into the applicator 202 through inlet nozzle 244. In alternate embodiments, conduit 224 may introduce process gas 222 into applicator 202 through a process gas inlet (not shown) that is not integrated with inlet nozzle 244. The process material 232 passes through plasma 214 in applicator 202 where the process material 232 is transformed by ions created from process gas 222 by plasma 214. In the embodiment of FIG. 6, the transformed process material is ejected through outlet nozzle 248 where it may be collected for future use or applied directly onto an application substrate material or "workpiece" (not shown). Outlet nozzle 248 is an example of a spray port. A spray port is an apparatus element that is configured to spray or deposit plasma-modified material onto a workpiece or into a collection vessel. Some embodiments do not employ a carrier gas.

In the embodiment of FIG. 6, a segmented microwave transparent tube 246 connects inlet nozzle 244 with outlet nozzle 248. Arc generators 210 are installed between the segments of tube 246. Even if the joints between the segments of tube 246 and the arc generators 210 are not gas tight, tube 246 helps direct the flow of process gas 222, process material 232, and carrier gas 238 through the applicator 202. Such flow may be further enhanced by providing a comparatively high pressure inert gas (not shown) between the interior of the walls of applicator 202 and the exterior wall of tube 246.

For the production of metal nano-element agglomerates, process material source 230 (FIG. 6) may function as a metal catalyst feeder (analogous to metal catalyst feeder 21 in FIG. 1) and process gas source 220 (FIG. 6) may function as a nano-element feeder (analogous to nano-element feeder 23 in FIG. 1). In this embodiment, process material 232 in FIG. 6 is analogous to metal catalyst feed material 22 in FIG. 1 and process gas 222 in FIG. 6 is analogous to nano-element feed material 24 in FIG. 1. Carrier gas 238 in FIG. 6 is analogous to fluid feed stream 20 in FIG. 1. Plasma 214 is illustrative of heat source 11 in FIG. 1. Applicator 202 of FIG. 6 is analogous to vaporizer 12 of FIG. 1, and when the process material 232 and the process gas 222 enter the plasma 214, metal catalyst vapor is formed from the metal catalyst feed material and atomic nano-element is established from the nano-element feed material. As the metal catalyst vapor and the atomic nano-element enter outlet nozzle 248 in FIG. 6 (analogous to condenser 15 in FIG. 1), the metal catalyst vapor condenses into metal catalyst particles and the atomic nano-element consolidates into nano-element nano-particle clusters and the metal catalyst particles and the nano-element nano-particle clusters aggregate as metal nano-element agglomerates (analogous to the nano-element agglomerates 34 in FIG. 1).

Because of their energy-efficient electronic-type vaporizer systems, hollow cathode glow discharge systems (e.g., 50 in FIG. 2) and non-magnetically constrained microwave plasma generator systems (e.g., 200 in FIG. 6) are particularly useful mechanisms for producing metal nano-element agglomerates (34 in FIG. 1) and similar nanostructure material. Metal nano-element agglomerates (34 in FIG. 1) that are produced by apparatuses such as those depicted in FIGS. 1, 2, 3, 4, and 6 may be collected and used to produce nanotubes. Where the nano-element agglomerates 34 comprise carbon, annealing (heating) of these metal nano-element agglomerates 34 causes very rapid formation of carbon nanotubes. This process is referred to as a "condensed phase conversion process." When the metal nano-element agglomerates 34 comprise carbon, if some carbon nanotubes have already formed in the collected mass from the metal nano-element agglomerate 34 production, then those carbon nanotubes will grow further during the annealing process. Carbon nanotubes that are grown in the presence of a magnetic or electric field will be physically aligned. Such a magnetic or electric field is called a "force field."

Figure 7:
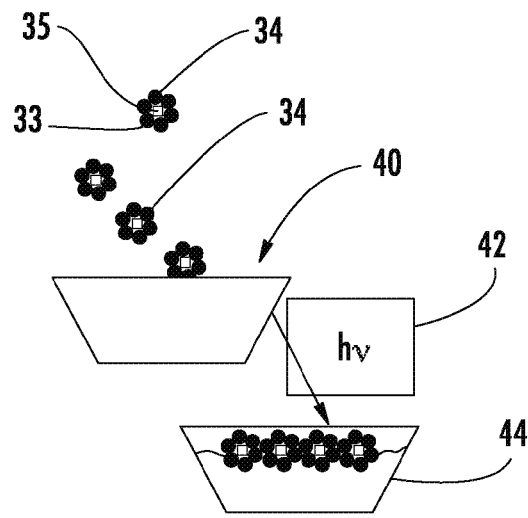
FIG. 7 is a schematic representation of the production of nanotubes from precursor materials according to the invention.

FIG. 7 presents a simplified illustration of the annealing process. Metal nano-element agglomerates 34 (as also depicted in FIG. 1) are deposited into a vessel 40. Heat energy 42 (represented by symbol hυ, where υ is the Greek letter "nu") is applied to the metal nano-element agglomerates 34 thereby creating a nanoparticle mass 44. In preferred annealing embodiments, the nanoparticle mass 44 is heated at least to a temperature at which nano-element dissolves into the nano-elemetized metal particles 35 depicted in FIG. 1 that were contained in the metal nano-element agglomerates 34. That temperature for carbon dissolving is below the melting temperature of the nano-elemetized metal particles. For example, carbon begins dissolving into iron at about 500° C. and at temperatures above 910° C., carbon rapidly dissolves into iron to form a solid solution that contains as much as 1% carbon by weight. For purposes of this specification, the temperature at which carbon begins dissolving into a metal is termed the "carbon solubility temperature." In the general case, the temperature at which a nano-element begins dissolving into a metal is termed the "nano-element solubility temperature."

As previously indicated, it is preferred that nano-elemetized metal particles included in the metal nano-element agglomerates 34 be nano-sized (and most preferably in the range of 1-20 nanometers) in order to produce single wall carbon nanotubes. For nano-elemetized metal particles that are nano-sized it is preferable to heat the nano-elemetized metal particles to a temperature above approximately 500° C. If the nano-elemetized metal particles are larger than nano-sized, the production of nanotubes from metal nano-element agglomerates 34 is enhanced by any minute irregular features, particularly features that look like pointed caps, that are formed on the surface of the nano-elemetized metal particles during the production of the metal nano-element agglomerates 34. In such embodiments, the minute irregular features represent a supported catalyst structure. For example, carbon that has been absorbed by the nano-elemetized metal particles tends to emerge from such irregular features as a carbon nanotube. In embodiments where the nano-elemetized metal particles are larger than nano-sized, the mixture of metal nano-element agglomerates 34 are preferably heated to a temperature that is above 500° C. but below the mushy state. The mushy state is a term of art for a state of metals that is semi-solid, i.e., in the range between the solidus and liquidus. For example, iron turns "mushy" at approximately 1470° C. before it melts at 1510° C. The reason for heating nano-elemetized metal particles that are larger than nano-sized to a temperature that remains below the mushy state is that the previously described beneficial irregular features on the surface of the nano-elemetized metal particles in the metal nano-element agglomerates 34 do not degenerate at temperatures below the mushy state, and therefore these features are available as fertile growth sites for nanotubes. Catalyst feature sizes of 1 to 5 nanometers are preferable but feature sizes up to 100 nanometers are acceptable for the features to be a growth sites.

The process of heating metal nano-element agglomerates 34 continues for a period of time at least sufficient to create nanotubes. In the case of carbon, the production or continued growth of carbon nanotubes will start as soon as the temperature of the catalyst reaches the point at which carbon starts to go into solution with the particular metal. This temperature may be from 500° C. up to the metal catalyst vaporization temperature. The preferable temperature is between 700° C. and 1100° C. The rate of formation is extremely fast, on the order of speed of atom mobility in the Metal-Carbon system. The actual rate will depend upon the temperature, environment (inert gas or vacuum is preferable), and available carbon. Amorphous carbon is preferable. To insure that all available carbon is consumed, a reaction time of at least 30 minutes is desirable. However, such length of time is not necessary for nanotube formation and continued growth because growth starts as soon as the temperature described above is reached.

Figure 8:
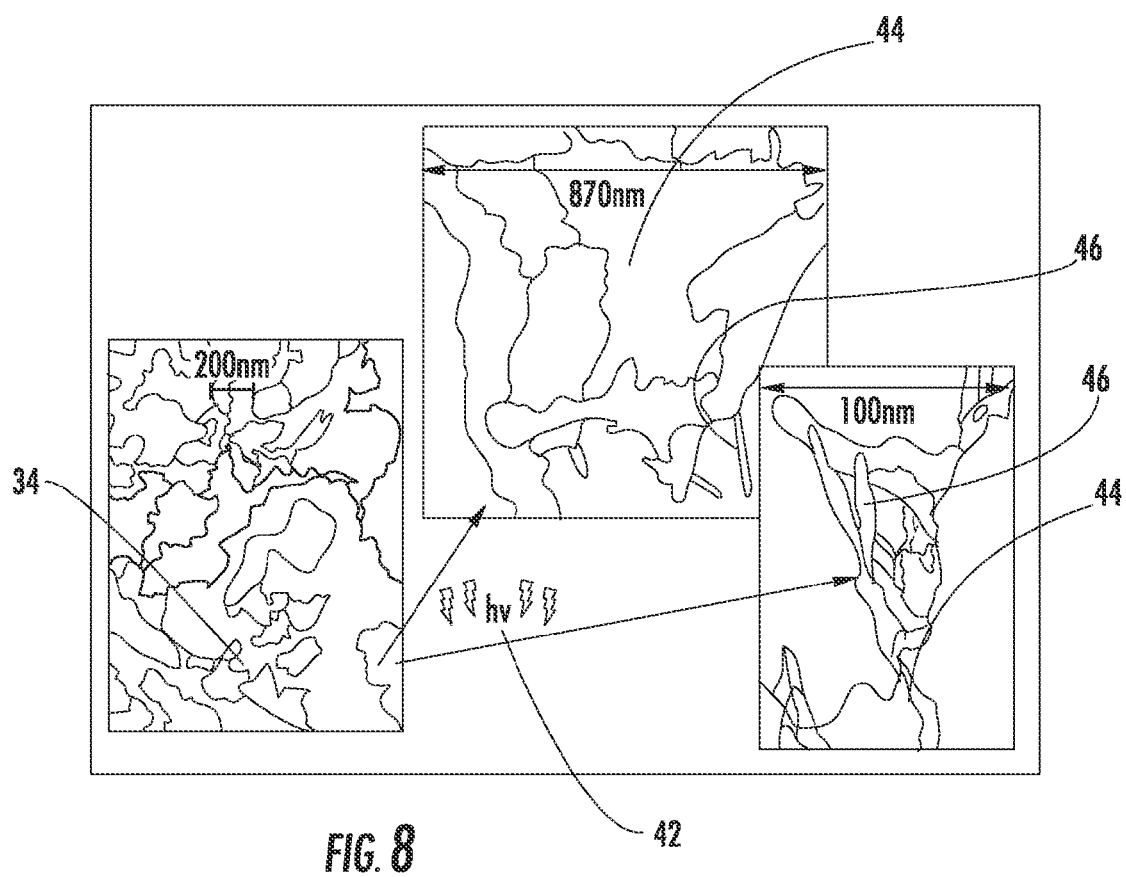
FIG. 8 is an illustration of the growth of nanotubes according to the invention.

FIG. 8 illustrates the conversion of metal nano-element agglomerates 34 into a nanoparticle mass 44 that contains nanotubes 46. Heat energy 42 is applied to nanoparticle mass 44 to produce the nanotubes 46.

A nanoparticle mass 44 fabricated using carbon as the nano-element typically contains a combination of amorphous carbon and graphite and perhaps diamond (collectively referred to as "residual carbon"), metal catalyst, and nanotubes. The metal catalyst may be removed from the mixture of residual carbon, nanotubes, and metal catalyst by dissolving the metal in acid. Either hydrochloric acid or nitric acid in approximately four molar concentration may be used without significant damage to the nanotubes. Other systems that may be used for removing the metal catalyst include magnet separators, electrostatic separators, and separators such as centrifuges, gravity separators, air tables, fluidized beds, pneumatic separators, vortex separators and similar devices that separate materials based upon density differences.

One way to separate the residual carbon from the nanotubes is to oxidize the mixture using air or oxygen at elevated temperatures. The residual carbon particles are preferentially oxidized leaving the nanotubes relatively undamaged as long as temperatures are kept below approximately 500° C. That is, various forms of carbon oxidize at different temperatures. Amorphous carbon oxidizes at the lowest temperature, starting around 400° C. Graphitic carbon and carbon multi-wall nanotubes are more resistant to oxidation. Single-wall carbon nanotubes are the most resistant to oxidation, and typically do not oxidize until 700° C. Transmission electron microscopy (TEM) and thermal gravimetric analysis (TGA) analysis provides a means of qualitatively assessing the production percentage of single-wall nanotubes. The assessment may be made quantitative by further incorporating Raman spectroscopy and ICP (inductively coupled plasma) elemental analysis.

Also, a simultaneous differential scanning calorimetry and thermal gravimetric analysis (DSC-TGA) may be conducted in "zero-grade" air (<2 ppm water, <0.05 ppm total hydrocarbon). Typically, a small sample size (30-100 mg) with a heating rate of 10° C./min from room temperature to 850° C. is used to perform the study. The weight loss of the sample at around 200° C. is from desorption of physisorbed water. Oxidation typically starts around 400° C. All carbon material except single-wall nanotubes will be oxidized before the temperature reaches 700° C. Typically, all single-wall nanotubes will be oxidized when the temperature reaches 750° C., so any remaining weight is non-carbon material—such as metal catalyst material. Thus, this method may be used to run a quantitative assay of the various forms of carbon in a material sample.

Another method for separating carbon nanotubes from residual carbon is first forming a liquid suspension of the carbon/nanotube mixture, then removing the large carbon particles by such mechanical means as sedimentation or centrifugation, and then forming a colloidal suspension of the remaining particles in water with a surfactant and then filtering the solution to remove the nanotubes. This technique for separating carbon nanotubes from residual carbon is also applicable to non-carbon nano-element nanotubes, (i.e., silicon nanotubes, germanium nanotubes, and boron nanotubes).

Figure 9:
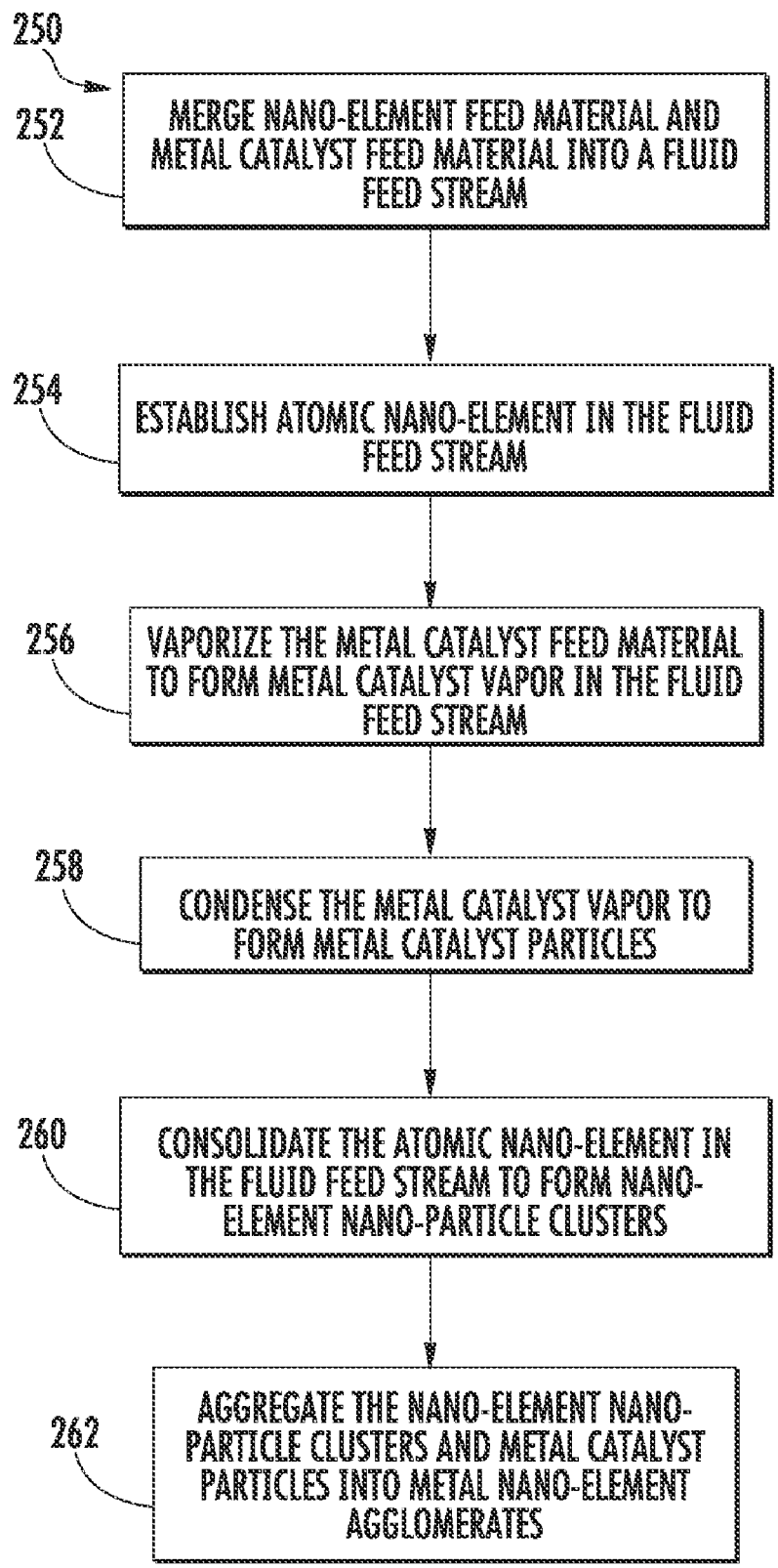
FIG. 9 is a flow chart of a method for processing materials according to the invention.

It is important to recognize that various methods are provided for fabricating nano-structure material. One method is illustrated in FIG. 9. Method 250 begins with a step 252 of merging nano-element feed material and metal catalyst feed material into a fluid feed stream. Then in step 254 atomic nano-element (e.g., atomic carbon) is established in the fluid feed stream, and in step 256 the metal catalyst feed material is vaporized to form metal catalyst vapor in the fluid feed stream. The metal catalyst vapor is condensed in step 258 to form metal catalyst particles, and the atomic nano-element in the fluid feed stream is consolidated in step 260 to form nano-element nano-particle clusters. Finally, in step 262 the nano-element nano-particle clusters and metal catalyst particles are aggregated into metal nano-element agglomerates. The metal nano-element agglomerates typically include some nanotubes.

In some embodiments, the nanotubes that are produced are separated from the metal nano-element agglomerates and molded or cast into a selected shape for subsequent annealing or treatment by heat energy to form a nanostructured component. In some embodiments the nanotubes are mixed with other materials such as abrasives, bonding material, metals, or ceramics, and the mixture is formed into a tool.

In some embodiments metal nano-element agglomerates (e.g., metal nano-element agglomerates 34 in FIGS. 1 and 7) are molded or cast directly as a tool, without the annealing process depicted in FIG. 7. Direct molding or casting of metal nano-element agglomerates 34 as tools is practical because (1) some quantity of nanotubes are typically produced in the process of manufacturing the metal nano-element agglomerates 34, and (2) the process of molding or casting the metal nano-element agglomerates 34 produces additional nanotubes. In some embodiments supplemental materials such as abrasives or binders are added to the metal nano-element agglomerates 34.

In some embodiments, free-standing structures or components of carbon nanotubes and other nanostructured materials are produced by (1) depositing into a mold, (or pattern, mandrel, or substrate tooling) the carbon nanotubes and/or carbon nanotube clusters with the appropriate concentration of nano-sized metal catalyst particles and then (2) heat-treating, annealing, or sintering the deposit to from a monolithic carbon nanotube structure, followed by (3) removal of the component from the mold, pattern, mandrel, or substrate tooling.

New and advanced single point carbon nanotube turning (SPCNT) tools and carbon nanotube grinding wheels may be fabricated. Tools formed from the other nano-elements (i.e., silicon, boron, and germanium) may also be fabricated. Diamond and cubic boron nitride tools are the current state-of-the-art for single point turning. However, these tools have severe limitations for machining ceramic materials such as aluminum oxide and beryllium oxide and metals such as beryllium. The high volume production of carbon particles and/or nanotubes may be applied in a slurry or cast, condensed phased converted, and pressed into a component to produce single point carbon nanotube turning (SPCNT) tools and carbon nanotube grinding wheels. To form a slurry, the materials (feed, raw, precursors, etc.) may be blended or mixed in a dry state. However, mixing in the dry state is somewhat difficult because of the buildup of static charges and because dispersion is not necessarily uniform. In the most preferred embodiments, when blended in a slurry, the materials are blended or mixed with a liquid such as an alcohol (ethanol), dichloroethane, and other organic solvents and liquids or even in water. Cetyl Trimethyl Ammonium Bromide (CTAB) or Sodium Lauryl Sulfate (SLS) or Sodium Dodecyl Sulfate (SDS) may be used as surfactants to increase the uniformity of dispersion. The slurry may then be air dried or spray dried to form a powder which is further processed to make an ingot or a tool. When a phenolic resin or glassy carbon precursor is added as a powder it is a component of the blended materials or slurry.

In some embodiments more extensive processes are employed. One such method is as follows:

1. Carbon-based feed material is vaporized to form atomic carbon.
2. Metal catalyst feed material is vaporized to form atomic metal.
3. The atomic carbon forms nano-sized particles which, after a brief (typically 200 microsecond) interval, consolidate to form carbon nano-particle clusters.
4. After a time interval that is longer than the time interval for formation of carbon nano-particle clusters (and is typically 2 milliseconds), the metal catalyst condenses into preferably nano-sized metal catalyst particles.
5. The carbon nano-particle clusters and metal catalyst particles form metal carbon agglomerates that are large enough (>100 nanometers, generally) to penetrate the boundary layer at the surface of the deposition area. (Sub-100 nanometer-sized particles will generally not penetrate the boundary layer in the particle deposition system except by diffusion limited processes which are about three orders of magnitude too slow to economically produce components.)
6. The deposited metal carbon agglomerates are heated, sintered, or annealed to form the carbon nanotube structure.
7. The metal carbon agglomerates are supplied at a rate sufficient to maintain the growth of the carbon nanotubes.
8. The deposition is performed by a method to allow and achieve directed growth and/or directed deposition of carbon nanotubes.
9. The directed growth is performed by a method to allow and achieve the specific shape and form of a specific component geometry and structure.
10. The source of the carbon and metal catalyst feed materials may be powder, wire, rod, gas, etc., in atomic and/or molecular forms and either fed independently or as a pre-blended material in the appropriate carbon-to-metal concentration ratio.
11. The vaporization of the carbon and metal catalyst feed materials may be achieved by one of several rapid, high heat flux methods including CVD, laser, plasma energy, modified thermal spray processes (which include a number of processes such as plasma spray, combustion spray, flame spray, high-velocity oxyfuel or HVOF spray, or arc spray), arc processes, infrared radiation, microwave energy, etc.
12. The heating or annealing of the deposited aggregates may be achieved by one of several rapid, high heat flux methods including CVD, laser, plasma energy, modified thermal spray, arc processes, infrared radiation, microwave energy, etc., methods.

One approach for fabrication of a SPCNT tool is outlined in the following steps:

1. Materials, such as carbon nanotubes (multiwalled, single-walled, nanohorns, etc.) or other nano-element nanostructure material with or without residual surface carbon (or with or without residual surface nano-element in the generalized case of nano-element nanostructure material), and a metal catalyst (such as Fe, Co, Ni, CoNi, etc., at a concentration 1-3% atomic percent) and/or Buckminster fullerenes (bucky balls), and/or secondary abrasive particles (such as diamond, tungsten carbide, etc.), and/or metal alloy powder (iron based, nickel, bronze, etc.), are blended and/or made into slurry. In the most preferred embodiments at least a portion of the metal catalyst is nano-sized.

2. The materials are placed in a tooling or mold container, such as graphite, polished tool steel (coated with yttria, boron nitride, etc., paint), etc., that provides a near-net shape.

3. The composite mix is hot pressed (typically in an inert gas environment or vacuum) between one-half the melting point and the melting point (preferably closer to the melting point and typically 80% of melting point) of the metal alloy.

4. The composite material block or mass is then shaped into a tool with appropriate radius and rake angle by grinding, EDM, and/or polishing.

5. The finished tool head insert is secured in a tool post.

Figure 10A:
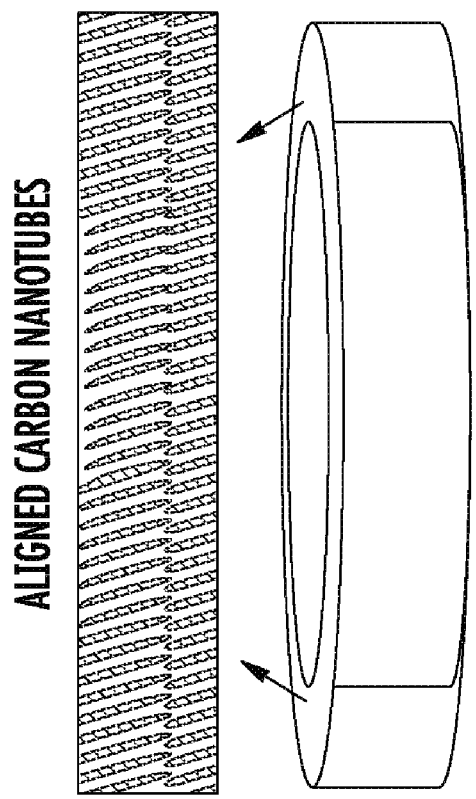
FIGS. 10A and 10B depict abrasive coatings formed on the working surface of grinding tools.
Figure 10B:
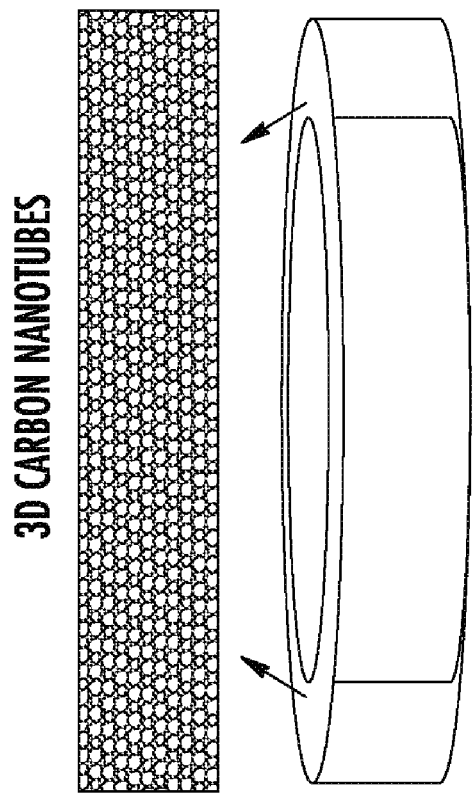

An abrasive coating may be formed on the working surface of a grinding tool as shown in FIGS. 10A and 10B. The method provides a manufacturing technique for depositing carbon nanotube abrasive coatings, using casting, molding, forming, pressing, or spraying technology, onto the working surface of tools having a variety of shapes and sizes, followed by the condensed phase conversion process. The method is applicable to a variety of tools, ranging from (1) small tools such as drill bits, saws, knives, to (2) mid-side industrial tooling such as machine tools, cutting tools, and grinding wheels, and even to (3) large-area and complex-shaped tools for such uses as tunneling, oil well drilling and bulldozing.

An example of one embodiment for tool fabrication is as follows. Initially, a tool substrate having a surface portion requiring an abrasive coating is provided. The tool substrate may comprise a metal, ceramic, polymer or composite material. Abrasive and bonding materials are also provided. It should be noted that the terms "bonding material," "bonding agent," "matrix," "matrix material," and "bonding matrix" are used interchangeably throughout this specification, to refer to the medium in which the abrasive particles or grains or nanotube abrasive particles, fibers, or grains are eventually fixed. The composite structure composed of carbon nanoparticles, carbon nanotubes, bucky balls, and/or diamond, in any combination, may form the composition before and/or after the consolidation process into a tool. The abrasive and bonding materials chosen will vary depending upon the particular application. However, it is generally preferred that the bonding material adhere to both the receiving surface of the tool and the surface of the abrasive particles. Other material characteristics must also be taken into account when choosing the materials to be used for a given application. For example, the coefficient of thermal expansion (CTE) of the tool substrate, bonding material, and abrasive are all important characteristics. Material CTE mismatches may result in poor adhesion between the bonding material and the abrasive particles, or between the bonding material and the receiving surface of the tool substrate.

The abrasive and bonding materials may be provided in a number of different forms. For example, they may be provided as individual or mixed slurries or powders. Alternatively, the abrasive and bonding materials may be supplied as a combined solid material, in shapes such as rods, cords and wires. Bonding materials supplied as a solid may be mixed, such that the abrasive particles are fixed in a bonding material matrix, and the abrasive and bonding materials may be applied to the tool surface.

A host of different abrasive materials may be used in combination with the carbon nanotube materials as the method of abrasive coating formation. Some examples of suitable abrasives that may be included in combination with the carbon nanotube materials are diamond (natural or synthetic); cubic boron nitride; boron carbide; tungsten carbide; silicon carbide; and aluminum oxide.

Some embodiments are used for the fabrication of machine tools, single-point turning tools, grinding wheels, etc., by the incorporation of and/or reinforcement by carbon nanotubes or other nanostructured material in various metal, ceramic, cermet, polymeric, carbon-carbon, abrasives, composites, etc., or any combinations of these. The manufacturing processes involved include those typically used in the processing of metal alloy, ceramic, cermet, polymeric, carbon-carbon, abrasive, composite, etc., materials. Various approaches and manufacturing processes and/or steps may be utilized to fabricate a tool. Some basic processes used to manufacture machine tools whereby carbon nanotubes and other nanostructures materials are included are extrusion processes, pressing operations, sintering processes, ball milling, spraying drying, carbonization processes, etc. The following outline of manufacturing process descriptions is not meant to be all-inclusive or to exclude manufacturing used to process the listed materials, but rather to provide an outline of several examples.

1. Nano-materials, such as carbon nanotubes (with or without residual surface carbon), and metal catalyst (such as Fe, Co, Ni, CoNi, etc., at a concentration 1-3% atomic percent) and/or bucky balls, and/or secondary abrasive particles (such as diamond, tungsten carbide, etc.), and/or metal alloy powder (iron based, nickel, bronze, etc.), are blended and/or made into slurry.

2. The materials are placed in a tooling or mold container, such as graphite, polished tool steel (coated with yttria, boron nitride, etc., paint), etc., that provides a near-net shape.

3. The composite mix is hot pressed (typically in an inert gas environment or vacuum) between one-half the melting point and the melting point (preferably closer to the melting point and typically 80% of the melting point) of the metal alloy.

4. The composite material block or mass is then shaped into a tool with appropriate radius and rake angle by grinding, electrical discharge machining (EDM), and/or polishing.

5. The finished tool head insert is secured in a tool post.

Fabrication of a nano-structured machine tool may also be accomplished by the embodiment outlined in the following steps:

1. Nano-materials, such as carbon nanotubes, with or without residual surface carbon, metal catalyst (such as Fe, Co, Ni, CoNi, etc., at a concentration 1-3% atomic percent) and/or bucky balls, and/or secondary abrasive particles (such as diamond, tungsten carbide, etc.), and/or metal alloy powder (iron based, nickel, bronze, etc.), are blended and/or made into slurry.

2. The materials are placed in a tooling or mold container, such as graphite, polished tool steel (coated with yttria, boron nitride, etc., paint), etc., that provides a near-net shape.

3. The composite mix is hot pressed (typically in an inert gas environment or vacuum) between one-half the melting point and the melting point (preferably closer to the melting point and typically 80% of the melting point) of the metal alloy.

4. The composite material block or mass is then shaped into a tool with appropriate radius and rake angle by grinding, EDM, and/or polishing.

5. The tool is sintered (such that residual carbon and/or surface carbon goes into solution in the metal alloy system).

6. The tool edges are re-shaped, if required, by appropriate material removal methods such as polishing.

7. The finished tool head insert is secured in a tool post.

A further embodiment for fabrication of a nano-structured machine tool is outlined in the following steps:

1. A metal alloy or cermet system is ball-milled to a fine powder.

2. Nano-materials, such as carbon nanotubes, with or without residual surface carbon, metal catalyst (such as Fe, Co, Ni, CoNi, etc., at a concentration 1-3% atomic percent) and/or bucky balls, and/or secondary abrasive particles (such as diamond, tungsten carbide, etc.), and/or metal alloy powder (iron based, nickel, bronze, etc.), are blended and/or made into slurry.

3. The materials are spray dried to form a powder encapsulating the composite mix in each particle.

4. The materials are placed in a tooling or mold container, such as graphite, polished tool steel (coated with yittria, boron nitride, etc., paint), etc., that provides a near-net shape.

5. The composite mix is hot pressed (typically in an inert gas environment or vacuum) between one-half the melting point and the melting point (preferably closer to the melting point and typically 80% of the melting point) of the metal alloy.

6. The composite material block or mass is then shaped into a tool with appropriate radius and rake angle by grinding, EDM, and/or polishing.

7. The tool is sintered (such that residual carbon and/or surface carbon goes into solution in the metal alloy system).

8. The tool edges are re-shaped, if required, by appropriate material removal methods such as polishing.

9. The finished tool head insert is secured in a tool post.

A further embodiment for fabrication of a nano-structured machine tool is outlined in the following steps:

1. Nano-materials, such as carbon nanotubes, with or without residual surface carbon, metal catalyst (such as Fe, Co, Ni, CoNi, etc., at a concentration 1-3% atomic percent) and/or bucky balls, and/or secondary abrasive particles (such as diamond, tungsten carbide, etc.), and/or metal alloy powder (iron based, nickel, bronze, etc.), are blended and/or made into slurry.

2. The materials are extruded into a so-called "soft-state" or "green-state" for shaping by the dies of a hot pressing operation.

3. The materials are placed in a tooling or mold container, such as graphite, polished tool steel (coated with yittria, boron nitride, etc., paint), etc., that provides a near-net shape.

4. The composite mix is hot pressed (typically in an inert gas environment or vacuum) between one-half the melting point and the melting point (preferably closer to the melting point and typically 80% of the melting point) of the metal alloy.

5. The composite material block or mass is then shaped into a tool with appropriate radius and rake angle by grinding, EDM, and/or polishing.

6. The tool is sintered (such that residual carbon and/or surface carbon goes into solution in the metal alloy system).

7. The tool edges are re-shaped, if required, by appropriate material removal methods such as polishing.

8. The finished tool head insert is secured in a tool post.

A different embodiment employs the following steps:

1. Nano-materials, such as carbon nanotubes, with or without residual surface carbon, metal catalyst (such as Fe, Co, Ni, CoNi, etc., at a concentration 1-3% atomic percent) and/or bucky balls, and/or secondary abrasive particles (such as diamond, tungsten carbide, etc.), and/or metal alloy powder (iron based, nickel, bronze, etc.), are blended with phenolic resin, furan resin, and/or any precursor to glassy carbon (that can be made into a carbon-carbon system) and/or made into slurry.

2. The materials are placed in a tooling or mold container, such as graphite, polished tool steel (coated with yittria, boron nitride, etc., paint), etc., that provides a near-net shape.

3. The composite mix is pressed or hot pressed (typically in an inert gas environment or vacuum) into a near-net shape or net-shape.

4. The pressed composite material is carbonized.

5. The carbon-carbon composite material block or mass is then shaped into a tool with appropriate radius and rake angle by grinding, EDM, and/or polishing.

6. The finished tool head insert is secured in a tool post.

Another approach or description of a nanostructured machine tool manufacturing process is outlined in the following steps:

1. Nano-materials, such as carbon nanotubes, with or without residual surface carbon, metal catalyst (such as Fe, Co, Ni, CoNi, etc., at a concentration 1-3% atomic percent) and/or bucky balls, and/or secondary abrasive particles (such as diamond, tungsten carbide, etc.), and/or metal alloy powder (iron based, nickel, bronze, etc.), are blended with phenolic resin, furan resin, and/or any precursor to glassy carbon (that can be made into a carbon-carbon system) and/or made into slurry.

2. The materials are extruded into a so-called "soft-state" or "green-state" for shaping by the dies of a hot pressing operation.

3. The materials are placed in a tooling or mold container, such as graphite, polished tool steel (coated with yittria, boron nitride, etc., paint), etc., that provides a near-net shape.

4. The composite mix is pressed or hot pressed (typically in an inert gas environment or vacuum) into a near-net shape or net-shape.

5. The pressed composite material is carbonized.

6. The carbon-carbon composite material block or mass is then shaped into a tool with appropriate radius and rake angle by grinding, EDM, and/or polishing.

7. The finished tool head insert is secured in a tool post.

Benefits of the various embodiments are extensive. New methods are provided for producing nanoparticles and nanostructures in large quantities. A Controlled Zone, Non-Magnetically Constrained Microwave Plasma System (referred to as a CZ Microwave Plasma System), a microwave plasma spray apparatus, an RF plasma gun, and a hollow cathode glow discharge apparatus represent components of different embodiments. Methods are provided for the formation of carbon nanotubes, the growth of carbon nanotubes from heat-treated or annealed mixtures of carbon powder and catalyst powder, and methods for the fabrication of components or structural materials with practical deposition. Carbon nanotubes (CNTs), including MWNT (multi-walled nanotubes) and SWNT (single-walled carbon nanotubes) and other crystalline materials may be grown at rates on the order of cm/s axial growth for CNTs.

The CZ Microwave Plasma System has multiple applications in materials and structures manufacturing. The associated method is used to produce a working volume of high temperature plasma that is not magnetically constrained and may easily be configured for very long residence times. The mechanism converts a microwave field into a toroidal arc, and by passing a gas through the arc, plasma is produced. The working hot zone of the plasma may be expanded almost indefinitely by adding consecutive stages of the microwave converters in close proximity to each other so that the plasma extends from stage to stage. The length and volume of the hot zone may be tailored to the processing requirements. The plasma hot zone may be configured in shape, diameter, and length to provide control of the feed velocity for the processing materials and thus control the residence time in the plasma for processing materials. The residence time for materials processing is increased significantly. This plasma hot zone provides enhanced capability to produce new materials, coating depositions, and/or materials treatments by flowing through and volumetrically processing materials in the controlled, engineered plasma zone area. The defined plasma area and the velocity of the feed materials determine the volume of material processed.

Plasma spray embodiments may be used to produce nanoparticles because of the long residence time in the hot zone of the plasma. The nanoparticles may be produced by flowing feed materials through an RF plasma gun or by using the plasma in a DC transferred arc between the gun cathode and the work piece anode to melt and vaporize solid precursors.

The foregoing descriptions of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for fabricating nano-structure material, the method comprising:
   (a) merging nano-element feed material and metal catalyst feed material into a fluid feed stream;
   (b) establishing atomic nano-element in the fluid feed stream;
   (c) vaporizing the metal catalyst feed material to form metal catalyst vapor in the fluid feed stream;
   (d) condensing the metal catalyst vapor to form metal catalyst particles;
   (e) consolidating the atomic nano-element in the fluid feed stream to form nano-element nano-particle clusters; and
   (f) aggregating the nano-element nano-particle clusters and metal catalyst particles into metal nano-element agglomerates.

2. The method of claim 1 wherein the step of merging nano-element feed material and metal catalyst feed material into a fluid feed stream comprises merging a concentration of metal catalyst feed material that is between approximately one and three atomic percent of the combined amount of nano-element feed material and metal catalyst feed material.

3. The method of claim 1 wherein:
   step (a) comprises merging carbon feed material and metal catalyst feed material into a fluid feed stream;
   step (b) comprises establishing atomic carbon in the fluid feed stream;
   step (e) comprises consolidating the atomic carbon in the fluid feed stream to form carbon nano-particle clusters; and
   step (f) comprises aggregating the carbon nano-particle clusters and metal catalyst particles into metal carbon agglomerates.

4. The method of claim 3 wherein the step of merging carbon feed material and metal catalyst feed material into a fluid feed stream comprises merging a concentration of metal catalyst feed material that is between approximately one and three atomic percent of the combined amount of carbon feed material and metal catalyst feed material.

5. The method of claim 1 wherein:
   step (a) comprises merging silicon feed material and metal catalyst feed material into a fluid feed stream;
   step (b) comprises establishing atomic silicon in the fluid feed stream;
   step (e) comprises consolidating the atomic silicon in the fluid feed stream to form silicon nano-particle clusters; and
   step (f) comprises aggregating the silicon nano-particle clusters and metal catalyst particles into metal silicon agglomerates.

6. The method of claim 5 wherein the step of merging silicon feed material and metal catalyst feed material into a fluid feed stream comprises flowing metal catalyst feed material into the fluid feed stream before flowing silicon feed material into the fluid feed stream.

7. The method of claim 1 wherein:
   step (a) comprises merging boron feed material and metal catalyst feed material into a fluid feed stream;
   step (b) comprises establishing atomic boron in the fluid feed stream;
   step (e) comprises consolidating the atomic boron in the fluid feed stream to form boron nano-particle clusters; and
   step (f) comprises aggregating the boron nano-particle clusters and metal catalyst particles into metal boron agglomerates.

8. The method of claim 7 wherein the step of merging boron feed material and metal catalyst feed material into a fluid feed stream comprises flowing metal catalyst feed material into the fluid feed stream before flowing boron feed material into the fluid feed stream.

9. The method of claim 1 wherein:
   step (a) comprises merging germanium feed material and metal catalyst feed material into a fluid feed stream;
   step (b) comprises establishing atomic germanium in the fluid feed stream;
   step (e) comprises consolidating the atomic germanium in the fluid feed stream to form silicon nano-particle clusters; and
   step (f) comprises aggregating the germanium nano-particle clusters and metal catalyst particles into metal germanium agglomerates.

10. The method of claim 9 wherein the step of merging germanium feed material and metal catalyst feed material into a fluid feed stream comprises flowing metal catalyst feed material into the fluid feed stream before flowing germanium feed material into the fluid feed stream.

* * * * *

UNITED STATES PATENT AND TRADEMARK OFFICE
CERTIFICATE OF CORRECTION

| | | |
|---|---|---|
| PATENT NO. | : 7,909,907 B1 | Page 1 of 1 |
| APPLICATION NO. | : 12/552633 | |
| DATED | : March 22, 2011 | |
| INVENTOR(S) | : Edward B. Ripley et al. | |

It is certified that error appears in the above-identified patent and that said Letters Patent is hereby corrected as shown below:

On the Title page, item (75); the Inventors should read:

Edward B. Ripley, Knoxville, TN (US)
Jonathan S. Morrell, Knoxville, TN (US)
Roland D. Seals, Oak Ridge, TN (US)
Gerard M. Ludtka, Oak Ridge, TN (US)

Signed and Sealed this
Twenty-fourth Day of May, 2011

David J. Kappos
*Director of the United States Patent and Trademark Office*